United States Patent
Yonemura

(10) Patent No.: US 12,434,389 B2
(45) Date of Patent: Oct. 7, 2025

(54) PRESSURE SENSOR, GRIPPING DEVICE, AND ROBOT

(71) Applicant: SEIKO EPSON CORPORATION, Tokyo (JP)

(72) Inventor: Takayuki Yonemura, Suwa (JP)

(73) Assignee: SEIKO EPSON CORPORATION (JP)

( * ) Notice: Subject to any disclaimer, the term of this patent is extended or adjusted under 35 U.S.C. 154(b) by 152 days.

(21) Appl. No.: 18/475,874

(22) Filed: Sep. 27, 2023

(65) Prior Publication Data

US 2024/0100715 A1    Mar. 28, 2024

(30) Foreign Application Priority Data

Sep. 28, 2022  (JP) .................. 2022-154643

(51) Int. Cl.
*B25J 13/08* (2006.01)
*G01N 3/40* (2006.01)

(52) U.S. Cl.
CPC .............. *B25J 13/082* (2013.01); *G01N 3/40* (2013.01)

(58) Field of Classification Search
None
See application file for complete search history.

(56) References Cited

U.S. PATENT DOCUMENTS

| | | | |
|---|---|---|---|
| 2014/0238174 A1* | 8/2014 | Ikebe | G01L 5/009 73/862.621 |
| 2020/0300598 A1* | 9/2020 | Kim | G01L 5/0052 |
| 2022/0187971 A1* | 6/2022 | Aloui | G01L 5/162 |
| 2024/0300093 A1* | 9/2024 | Kobayashi | B25J 13/082 |

FOREIGN PATENT DOCUMENTS

| | | |
|---|---|---|
| JP | 2013-123769 A | 6/2013 |
| JP | 2015-158431 A | 9/2015 |
| JP | 6507492 B2 | 5/2019 |
| JP | 2019124645 A * | 7/2019 |

OTHER PUBLICATIONS

3600 STIC English translation of JP-2019124645-A. (Year: 2019).*

* cited by examiner

*Primary Examiner* — Jason Holloway
*Assistant Examiner* — Christopher A Buksa
(74) *Attorney, Agent, or Firm* — Harness, Dickey & Pierce, P.L.C.

(57) ABSTRACT

A pressure sensor includes a base having a mounting surface, an elastic member mounted on the mounting surface and forming a dome shape including a convex curved surface, a first pressure-sensitive element placed in a position between the mounting surface and the elastic member and corresponding to a vertex of the convex curved surface and outputting a first detection signal by sensing pressure, a second pressure-sensitive element placed in a position between the mounting surface and the elastic member and corresponding to a peripheral portion of the convex curved surface and outputting a second detection signal by sensing pressure, and a calculator performing a calculation on the first detection signal and the second detection signal, wherein the calculator measures hardness of an object based on a ratio $R_{1-1/2}$ between the first detection signal and the second detection signal when the object is pressed against the elastic member with a first load.

5 Claims, 12 Drawing Sheets

PRESSURE SENSOR, GRIPPING DEVICE, AND ROBOT

The present application is based on, and claims priority from JP Application Serial Number 2022-154643, filed Sep. 28, 2022, the disclosure of which is hereby incorporated by reference herein in its entirety.

BACKGROUND

1. Technical Field

The present disclosure relates to a pressure sensor, a gripping device, and a robot.

2. Related Art

When an object is griped using a robot hand, detection of a load applied to the robot hand from the object is desired. Thereby, for example, a force pressing the object by the robot hand and a force by which the object is to be dropped from the robot hand may be measured. As a result, the object may be properly gripped.

For example, JP-A-2015-158431 discloses a load sensor including a load detection unit having a pressure-sensitive conductor layer, an upper electrode, and a lower electrode, and a contactor placed in contact with the load detection unit. In the load sensor, at least one of the upper electrode and the lower electrode includes a center electrode and two or more split electrodes arranged around the center electrode. When a load acts on the load sensor, voltages output from the respective electrodes change.

In the load sensor disclosed in JP-A-2015-158431, when the output voltages change in the plurality of electrodes, a gripping load for gripping the object may be sensed by calculation of the changes of these output voltages. The gripping load is sensed, and thereby, the gripping force may be controlled and led to a proper operation.

However, in the load sensor disclosed in JP-A-2015-158431, it is difficult to sense a property of the object, specifically, hardness of the object. Accordingly, in a robot hand including the load sensor disclosed in JP-A-2015-158431, it may be impossible to control the gripping force in consideration of the hardness of the object. As a result, for example, when the object is soft, the object may be deformed and dropped from the robot hand.

Accordingly, realization of a pressure sensor that can accurately measure the hardness of the object only by contacting the object becomes a challenge.

SUMMARY

A pressure sensor according to an application example of the present disclosure includes a base having a mounting surface, an elastic member mounted on the mounting surface and forming a dome shape including a convex curved surface, a first pressure-sensitive element placed in a position between the mounting surface and the elastic member and corresponding to a vertex of the convex curved surface and outputting a first detection signal by sensing pressure, a second pressure-sensitive element placed in a position between the mounting surface and the elastic member and corresponding to a peripheral portion of the convex curved surface and outputting a second detection signal by sensing pressure, and a calculator performing a calculation on the first detection signal and the second detection signal, wherein the calculator measures hardness of an object based on a ratio $R_{1-1/2}$ between the first detection signal and the second detection signal when the object is pressed against the elastic member with a first load.

A gripping device according to an application example of the present disclosure includes a gripper gripping an object, a pressure sensor placed in the gripper, a driver driving the gripper, and a first controller controlling operation of the driver, wherein the pressure sensor includes a base having a mounting surface, an elastic member mounted on the mounting surface and forming a dome shape including a convex curved surface, a first pressure-sensitive element placed in a position between the mounting surface and the elastic member and corresponding to a vertex of the convex curved surface and outputting a first detection signal by sensing pressure, a second pressure-sensitive element placed in a position between the mounting surface and the elastic member and corresponding to a peripheral portion of the convex curved surface and outputting a second detection signal by sensing pressure, and a calculator calculating a ratio $R_{1-1/2}$ between the first detection signal and the second detection signal when the object is pressed against the elastic member with a first load, and the first controller has a function of, after starting the operation of the driver, continuing the operation of the driver when the ratio $R_{1-1/2}$ is smaller than a threshold and stopping the operation of the driver when the ratio $R_{1-1/2}$ is equal to or larger than the threshold.

A robot according to an application example of the present disclosure includes the gripping device according to the application example of the present disclosure, a robot arm to which the gripper is attached, and a second controller controlling motion of the robot arm.

DESCRIPTION OF EMBODIMENTS

As below, a pressure sensor, a gripping device, and a robot of the present disclosure will be explained in detail based on embodiments shown in the accompanying drawings.

1. Pressure Sensor

First, a pressure sensor according to an embodiment will be explained.

Figure 1:
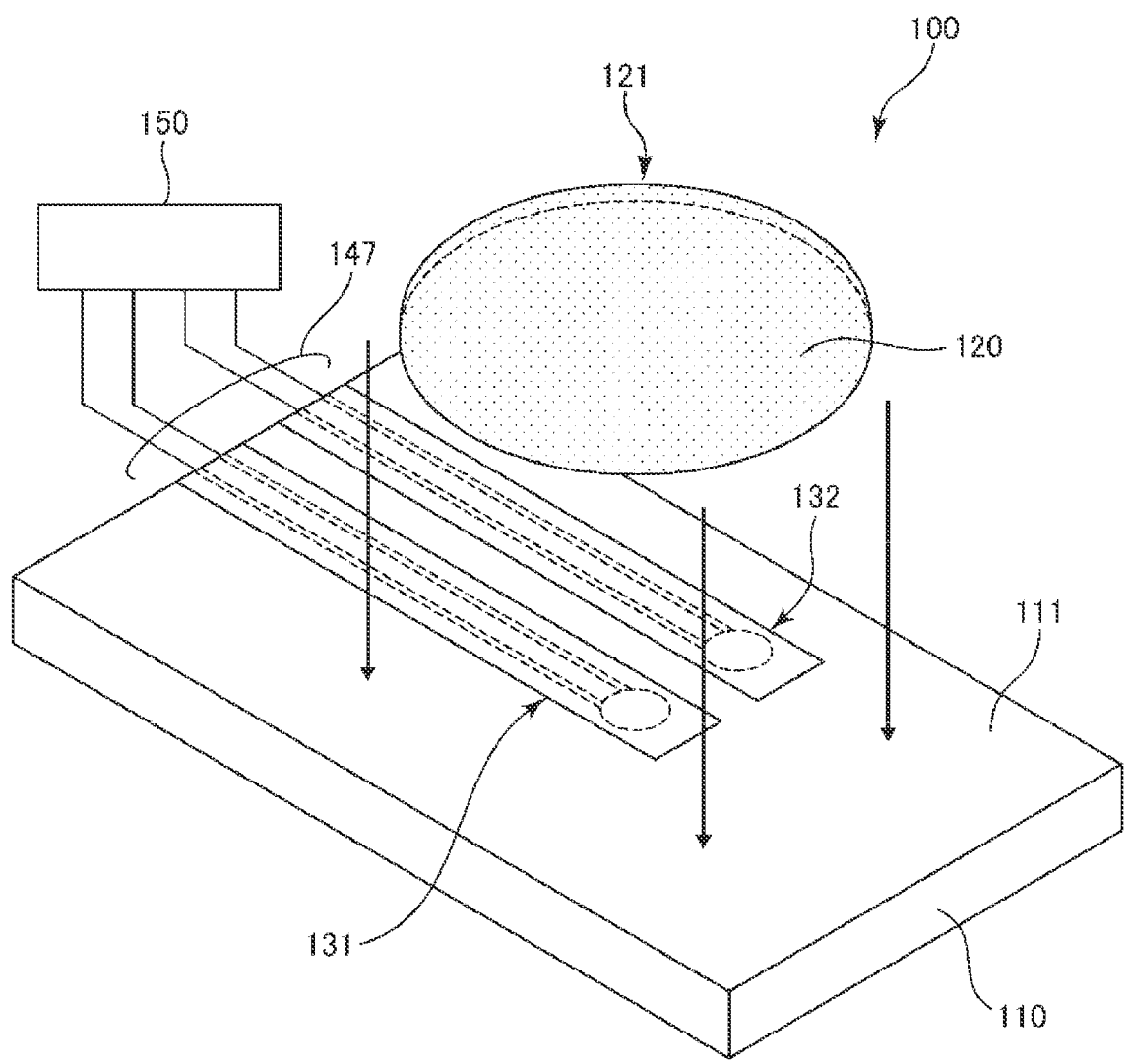
FIG. 1 is an exploded perspective view showing a pressure sensor according to an embodiment.
Figure 2:
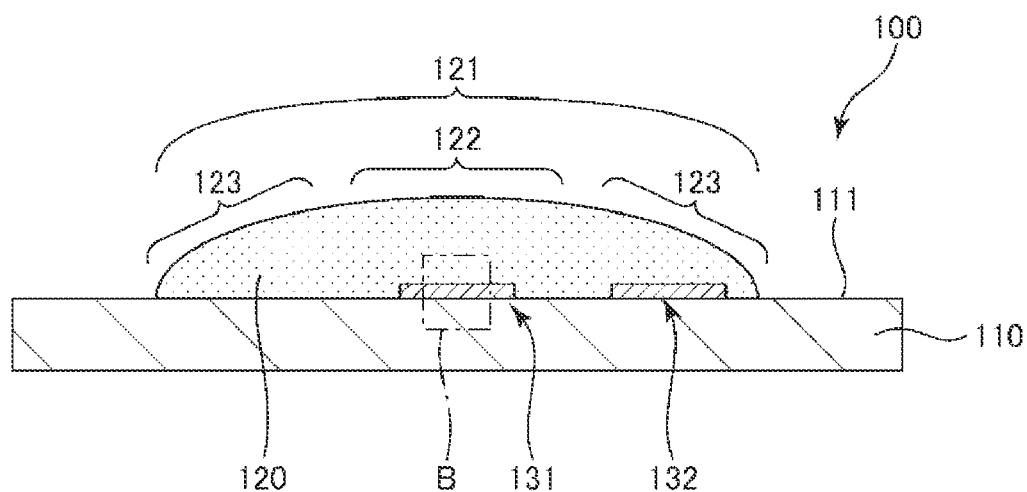
FIG. 2 is a sectional view of FIG. 1.
Figure 3:
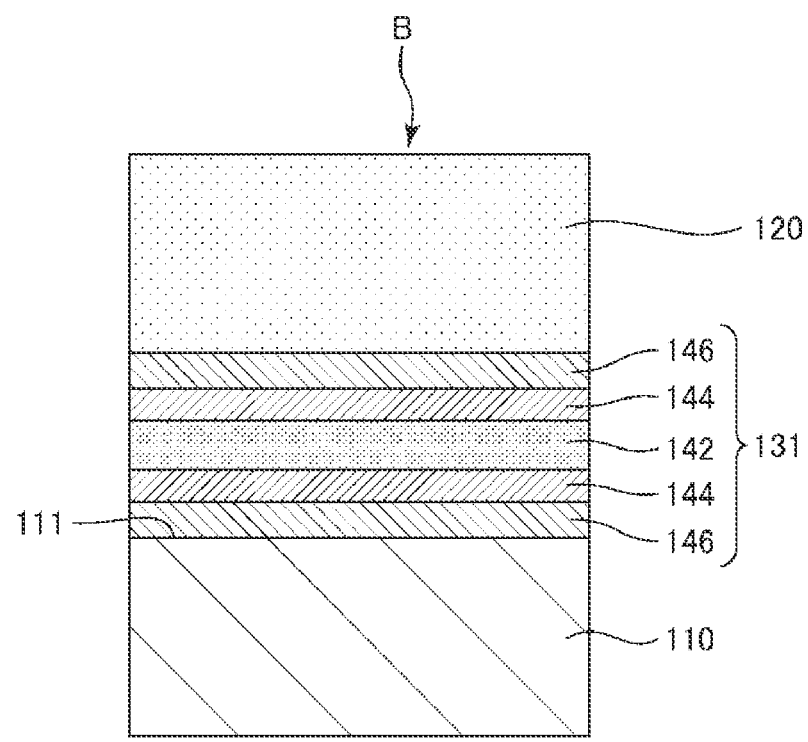
FIG. 3 is an enlarged view of a portion B in FIG. 2.

FIG. 1 is an exploded perspective view showing a pressure sensor 100 according to the embodiment. FIG. 2 is a sectional view of FIG. 1. FIG. 3 is an enlarged view of a portion B in FIG. 2.

As shown in FIG. 1, the pressure sensor 100 has a base 110 having a mounting surface 111, an elastic member 120 mounted on the mounting surface 111 and having a dome shape including a convex curved surface 121, a first pressure-sensitive element 131 and a second pressure-sensitive element 132, and a calculator 150. The elastic member 120 has elasticity and, when contacting an object, deforms due to a contact force applied from the object and propagates the contact force to the first pressure-sensitive element 131 and the second pressure-sensitive element 132.

The first pressure-sensitive element 131 and the second pressure-sensitive element 132 are placed between the mounting surface 111 and the elastic member 120. When the first pressure-sensitive element 131 and the second pressure-sensitive element 132 are pressed by the deformation of the elastic member 120, a first detection signal S1 is output from the first pressure-sensitive element 131 and a second detection signal S2 is output from the second pressure-sensitive element 132.

The calculator 150 measures hardness of the object based on a ratio $R_{1-1/2}$ between the first detection signal S1 and the second detection signal S2 when the object is pressed against the elastic member 120 with a first load. Note that, in the following description, the ratio $R_{1-1/2}$ may be referred to as "hardness index".

As below, the structure of the first pressure-sensitive element 131 will be explained. Note that the structure of the second pressure-sensitive element 132 is the same as that of the first pressure-sensitive element 131 and the explanation thereof will be omitted.

As shown in FIG. 3, the first pressure-sensitive element 131 has a pressure-sensitive conductor 142, a pair of electrodes 144, 144, and a pair of insulating sheets 146, 146. The first pressure-sensitive element 131 is an element having an electrical resistance value between the electrodes 144, 144 changing when subjected to a change in pressing force. A constituent material of the pressure-sensitive conductor 142 includes e.g., a conductive elastomer and a conductive rubber. Note that the first pressure-sensitive element 131 may be an element in which the electrical resistance value of the pressure-sensitive conductor 142 itself changes due to a change in pressing force or an element in which a contact resistance value between the pressure-sensitive conductor 142 and the electrodes 144 changes.

A constituent material of the electrodes 144 includes e.g., a single element or an alloy of Al, Cu, Ni, Ag, Au, or the like. Wires 147 are coupled to the pair of electrodes 144, 144. The wires 147 couple the pair of electrodes 144, 144 and the calculator 150.

The base 110 includes e.g., a resin film, a resin substrate, and a ceramic substrate.

The elastic member 120 has elasticity and is placed on the mounting surface 111 to cover both the first pressure-sensitive element 131 and the second pressure-sensitive element 132. The elasticity refers to a property of deforming according to a force when the force is applied and returning to the original shape when the force is removed. Therefore, when a force is applied to the elastic member 120, the elastic member 120 deforms and the force is propagated.

Further, as shown in FIG. 2, the elastic member 120 has a convex curved surface 121. The convex curved surface 121 is a spherical or an aspherical curved surface projecting in a direction away from the mounting surface 111. Note that the shape of the convex curved surface 121 is not particularly limited.

The convex curved surface 121 shown in FIG. 2 has a vertex 122 as a portion projecting most, and a peripheral portion 123 around the vertex 122 in an amount of projection smaller than that of the vertex 122. That is, in the convex curved surface 121, the amount of projection becomes smaller from the vertex 122 toward the peripheral portion 123.

Note that, in the specification, a shape of an object having the convex curved surface 121 is referred to as "dome shape". The elastic member having the dome shape has a property of efficiently propagating the contact force as described above, and is useful as the elastic member 120 used for the pressure sensor 100.

A constituent material of the elastic member 120 includes e.g., rubber, elastomer, and foam resin. Of the materials, the rubber includes e.g., polyisobutylene, polyisoprene, chloroprene rubber, butyl rubber, silicone rubber, fluoro-rubber, acrylic rubber, urethane rubber, ethylene-propylene rubber, butadiene rubber, acrylonitrile butadiene rubber, and styrene-butadiene rubber.

When the elastic member 120 and the object come closer to each other, the vertex 122 preferentially contacts. In this case, pressure is preferentially applied to the first pressure-sensitive element 131 to the second pressure-sensitive element 132 and the first detection signal S1 is output.

Figure 4:
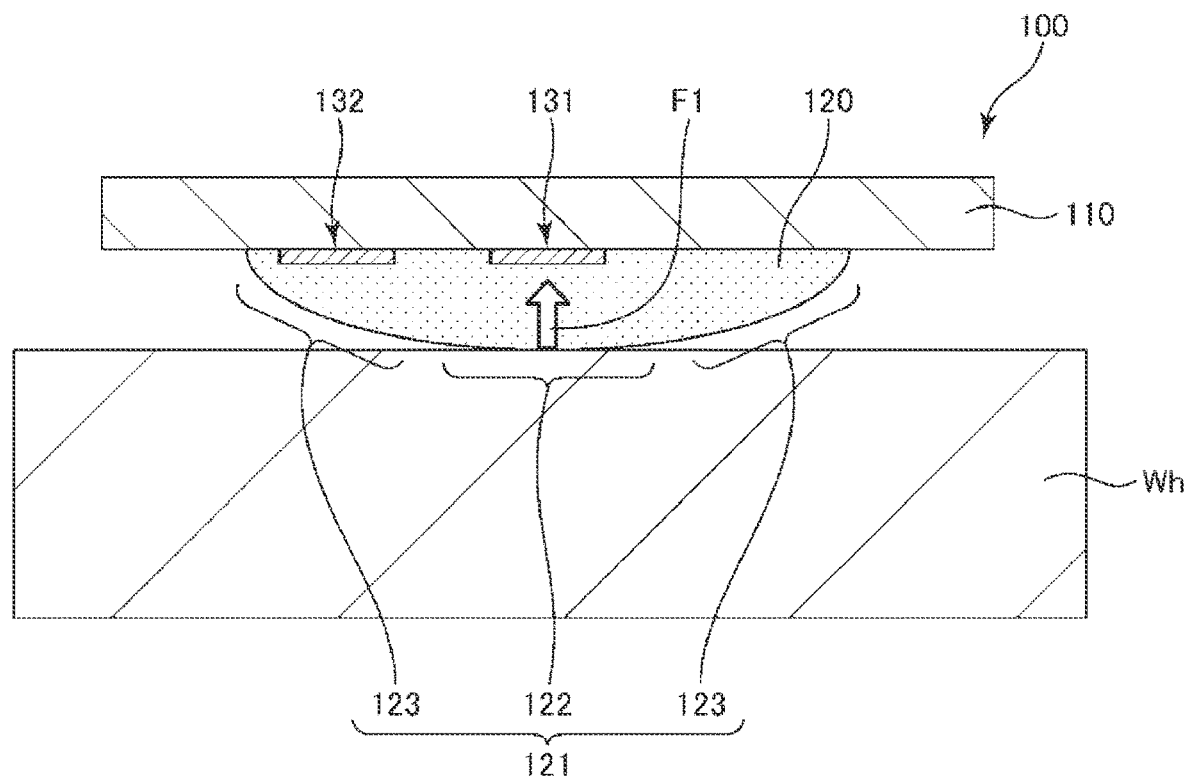
FIG. 4 is a schematic diagram for explanation of a principle of measuring hardness of an object by the pressure sensor shown in FIG. 1.
Figure 5:
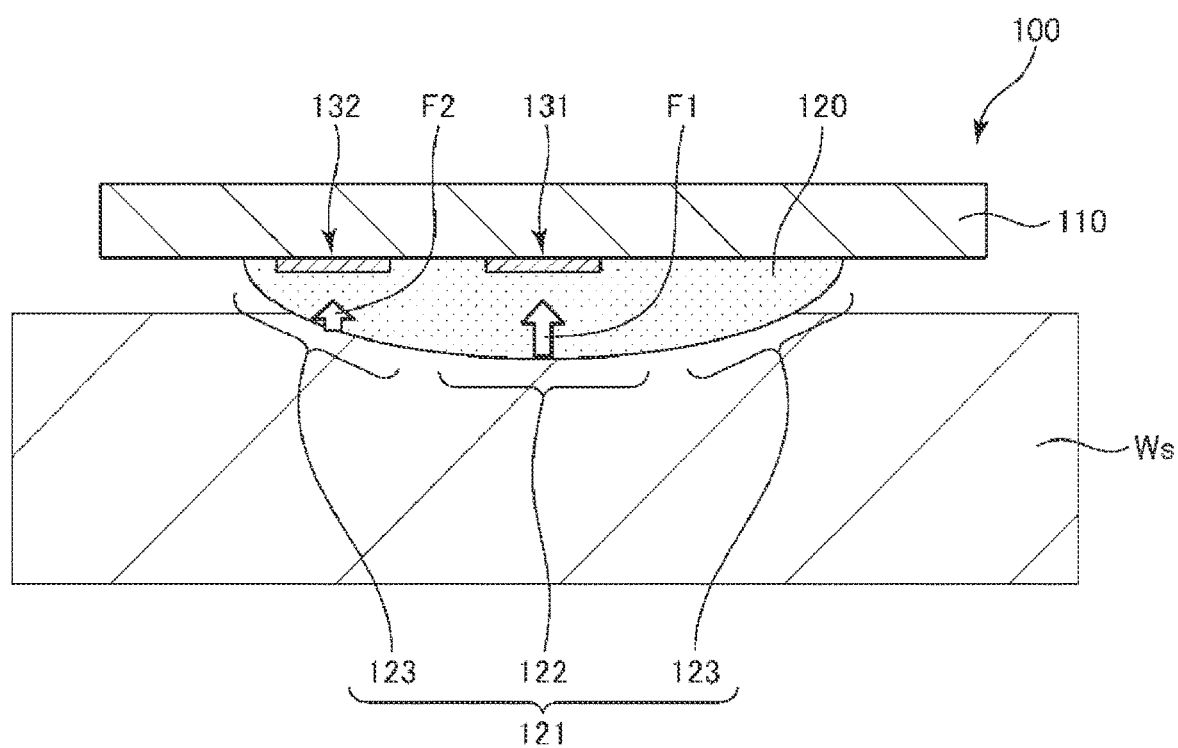
FIG. 5 is a schematic diagram for explanation of the principle of measuring hardness of an object by the pressure sensor shown in FIG. 1.

FIGS. 4 and 5 are schematic diagrams for explanation of a principle of measuring hardness of an object by the pressure sensor 100 shown in FIG. 1.

In FIG. 4, when the elastic member 120 of the pressure sensor 100 is pressed against a hard object Wh such as an iron ingot, a contact force applied from the object Wh to the elastic member 120 is shown. In FIG. 5, when the elastic member 120 of the pressure sensor 100 is pressed against a soft object Ws such as a sponge, a contact force applied from the object Ws to the elastic member 120 is shown.

In the example shown in FIG. 4, the object Wh is harder than the elastic member 120, and an amount of a dent of the elastic member 120 in the object Wh is smaller. Accordingly, a contact force F1 is generated in the vertex 122. As a result, the first detection signal S1 is output from the first pressure-sensitive element 131, but the second detection signal S2 is output little from the second pressure-sensitive element 132.

In the example shown in FIG. 5, the object Ws is softer than the elastic member 120, and an amount of a dent of the elastic member 120 in the object Ws is larger. Accordingly, not only the contact force F1 is generated in the vertex 122 but also a contact force F2 is generated in the peripheral portion 123. As a result, the first detection signal S1 is output from the first pressure-sensitive element 131 and the second detection signal S2 is output from the second pressure-sensitive element 132.

Therefore, by comparison between the first detection signal S1 and the second detection signal S2, hardness of the objects Wh, Ws may be evaluated. That is, the hardness of the objects Wh, Ws may be evaluated based on the first detection signal S1 output from the first pressure-sensitive element 131 provided in the position corresponding to the vertex 122 of the elastic member 120 and the second detection signal S2 output from the second pressure-sensitive element 132 provided in the position corresponding to the peripheral portion 123 of the elastic member 120.

Note that the hardness of the objects Wh, Ws is reflected on the amounts of the dents of the elastic member 120 and correspond to resistances to deformation of the objects Wh, Ws. The hardness of the objects Wh, Ws may be measured, and thereby, for example, the gripping force by the robot may be adjusted according to the hardness of the objects Wh, Ws. For example, when the gripped object Ws is softer, the amount of deformation of the object Ws itself is larger and the gripped object Ws may be dropped when the gripping force is weaker. The dropping of the object Ws may be suppressed by increase of the gripping force according to the hardness.

Figure 6A:
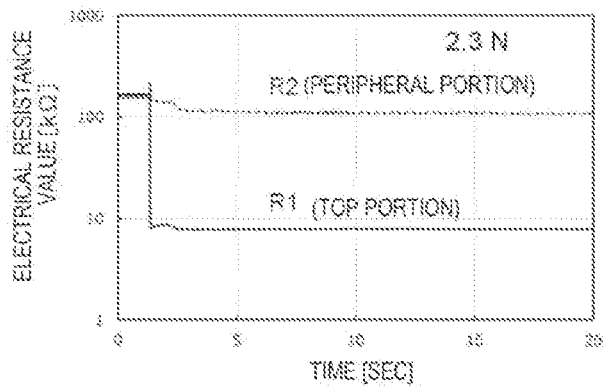
FIG. 6A is a graph showing temporal changes of an electrical resistance value R1 of a pressure-sensitive conductor of a first pressure-sensitive element and an electrical resistance value R2 of a pressure-sensitive conductor of a second pressure-sensitive element when an iron ingot is pressed against an elastic member with a load of 2.3 N.

FIG. 6A is a graph showing temporal changes of an electrical resistance value R1 of the pressure-sensitive conductor 142 of the first pressure-sensitive element 131 and an electrical resistance value R2 of the pressure-sensitive conductor 142 of the second pressure-sensitive element 132 when an iron ingot is pressed against the elastic member 120 with a load of 2.3 N. Further, FIG. 6B is a graph showing temporal changes of the electrical resistance value R1 of the pressure-sensitive conductor 142 of the first pressure-sensitive element 131 and the electrical resistance value R2 of the pressure-sensitive conductor 142 of the second pressure-sensitive element 132 when the iron ingot is pressed against the elastic member 120 with a load of 13.7 N.

Figure 6B:
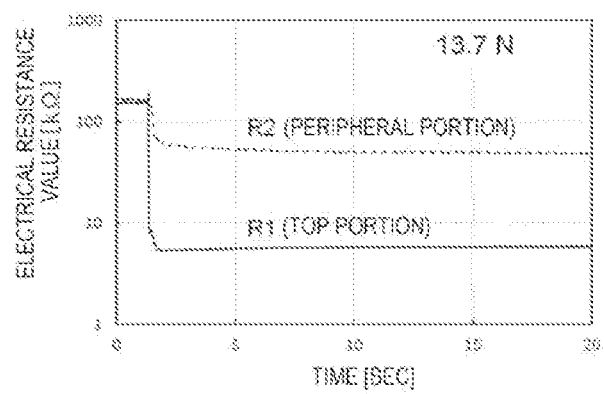
FIG. 6B is a graph showing temporal changes of the electrical resistance value R1 of the pressure-sensitive conductor of the first pressure-sensitive element and the electrical resistance value R2 of the pressure-sensitive conductor of the second pressure-sensitive element when the iron ingot is pressed against the elastic member with a load of 13.7 N.

In FIGS. 6A and 6B, differences between the electrical resistance values R1 of the pressure-sensitive conductor 142 of the first pressure-sensitive element 131 and the electrical resistance values R2 of the pressure-sensitive conductor 142 of the second pressure-sensitive element 132 are larger regardless of the magnitude of the load. That is, the contact force F1 applied to the vertex 122 of the elastic member 120 is larger than the contact force F2 applied to the peripheral portion 123.

Figure 7A:
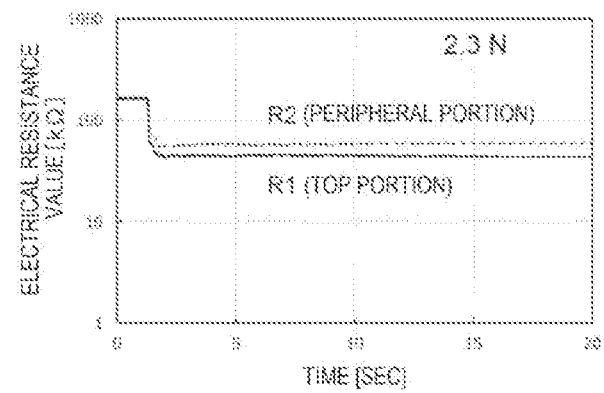
FIG. 7A is a graph showing temporal changes of the electrical resistance value R1 of the pressure-sensitive conductor of the first pressure-sensitive element and the electrical resistance value R2 of the pressure-sensitive conductor of the second pressure-sensitive element when a sponge is pressed against the elastic member with a load of 2.3 N.

FIG. 7A is a graph showing temporal changes of the electrical resistance value R1 of the pressure-sensitive conductor 142 of the first pressure-sensitive element 131 and the electrical resistance value R2 of the pressure-sensitive conductor 142 of the second pressure-sensitive element 132 when a sponge is pressed against the elastic member 120 with a load of 2.3 N. Further, FIG. 7B is a graph showing temporal changes of the electrical resistance value R1 of the pressure-sensitive conductor 142 of the first pressure-sensitive element 131 and the electrical resistance value R2 of the pressure-sensitive conductor 142 of the second pressure-sensitive element 132 when the sponge is pressed against the elastic member 120 with a load of 13.7 N.

Figure 7B:
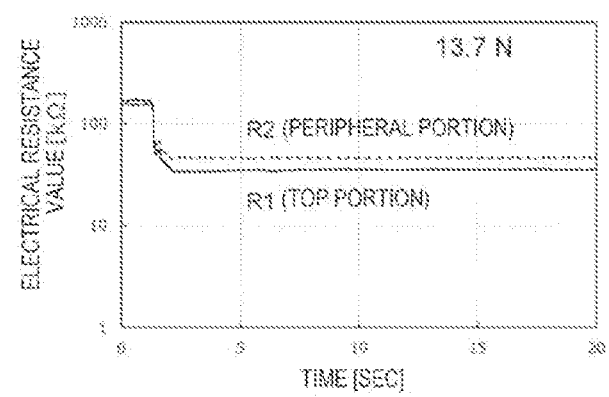
FIG. 7B is a graph showing temporal changes of the electrical resistance value R1 of the pressure-sensitive conductor of the first pressure-sensitive element and the electrical resistance value R2 of the pressure-sensitive conductor of the second pressure-sensitive element when the sponge is pressed against the elastic member with a load of 13.7 N.

In FIGS. 7A and 7B, differences between the electrical resistance values R1 of the pressure-sensitive conductor 142 of the first pressure-sensitive element 131 and the electrical resistance values R2 of the pressure-sensitive conductor 142 of the second pressure-sensitive element 132 are smaller than those in FIGS. 6A and 6B regardless of the magnitude of the load. That is, the difference between the contact force F1 applied to the vertex 122 of the elastic member 120 and the contact force F2 applied to the peripheral portion 123 is not large.

Therefore, the differences between the electrical resistance values R1, R2 shown in FIGS. 6A, 6B, 7A, and 7B are extracted as differences between the first detection signals S1 and the second detection signals S2, and thereby, the hardness of the iron ingot and the sponge may be relatively evaluated.

The difference between the first detection signal S1 and the second detection signal S2 may be quantified by calculation of a ratio of the signals. Not the difference, but the ratio is calculated, and thereby, the calculation result is harder to depend on the intensity of the respective signals.

To calculate the ratio, an intensity ratio between the respective signals may be calculated, however, it is preferable to obtain a ratio $\log(S1)/\log(S2)$ of a common logarithm $\log(S1)$ of the intensity of the first detection signal S1 to a common logarithm $\log(S2)$ of the intensity of the second detection signal S2. The electrical resistance values R1, R2 change according to the common logarithms of the contact forces F1, F2, and a constant correlation holds between the contact forces F1, F2 and the ratio $\log(S1)/\log(S2)$. Accordingly, the hardness of the objects Wh, Ws is easily evaluated using the ratios.

Figure 8:
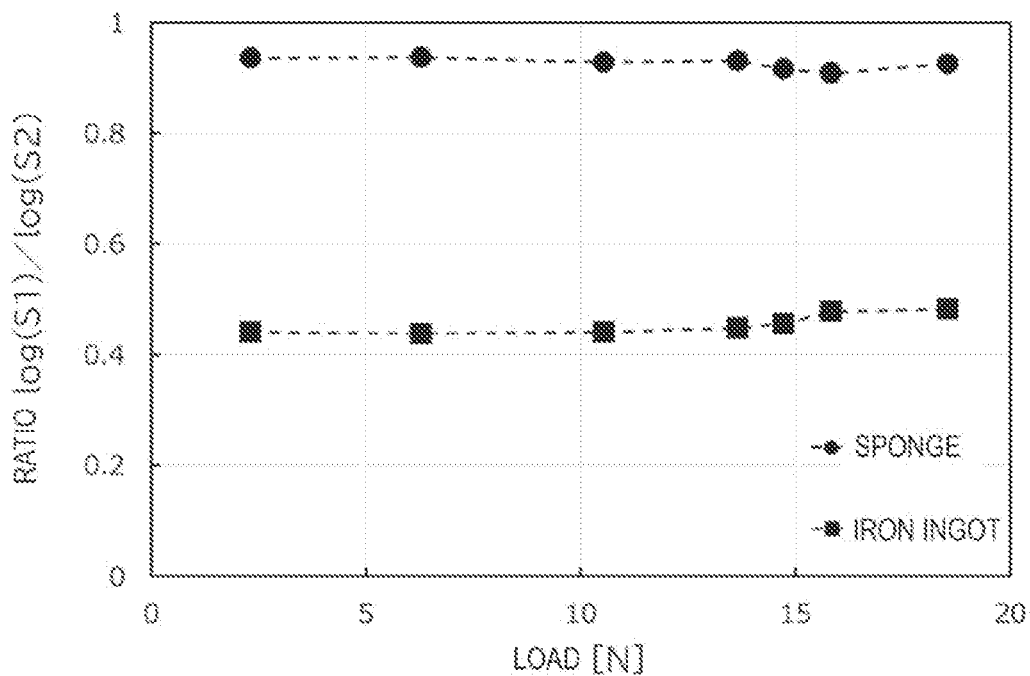
FIG. 8 is a graph showing relationships between a ratio log(S1)/log(S2) and a load applied to the elastic member when the iron ingot and the sponge are pressed against the elastic member.

FIG. 8 is a graph showing relationships between the ratio $\log(S1)/\log(S2)$ and the load applied to the elastic member 120 when the iron ingot and the sponge are pressed against the elastic member 120.

As shown in FIG. 8, differences are recognized in the ratios $\log(S1)/\log(S2)$ between the case where the iron ingot is pressed against the elastic member 120 and the case where the sponge is pressed against the elastic member 120. Therefore, the hardness of the object may be quantitatively evaluated based on the value of the ratio $\log(S1)/\log(S2)$. Further, for example, when the above described first load is 2.3 N, the value of the ratio log(S1)/log(S2) when the first load is applied is the above described "ratio $R_{1-1/2}$". There is a constant correlation between the ratio $R_{1-1/2}$ and the hardness of the object. A calibration curve or a table showing the correlation is created in advance, and thereby, the hardness of the object may be measured. Note that the first load is not limited to 2.3 N.

Furthermore, as shown in FIG. 8, the value of the ratio log(S1)/log(S2) is substantially constant even when the applied load changes. It is supported that the structures of the iron ingot and the sponge do not change even when the applied loads change. In other words, it is supported that the structure of the object changes when the value of the ratio log(S1)/log(S2) changes according to the applied load. Therefore, whether the structure of the object changes with the change in load may be evaluated based on the change of the value of the ratio log(S1)/log(S2).

Figure 9A:
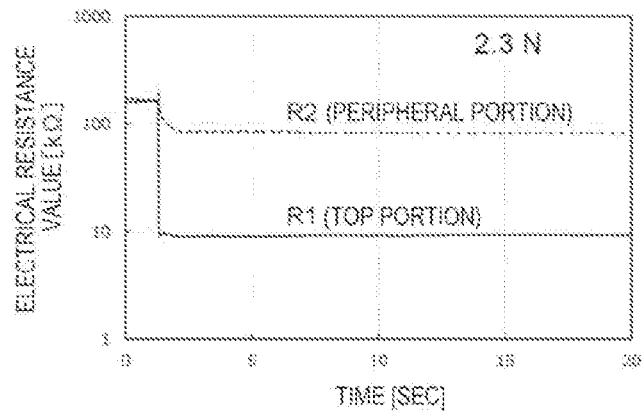
FIG. 9A is a graph showing temporal changes of the electrical resistance value R1 of the pressure-sensitive conductor of the first pressure-sensitive element and the electrical resistance value R2 of the pressure-sensitive conductor of the second pressure-sensitive element when a plastic cube is pressed against the elastic member with a load of 2.3 N.
Figure 9B:
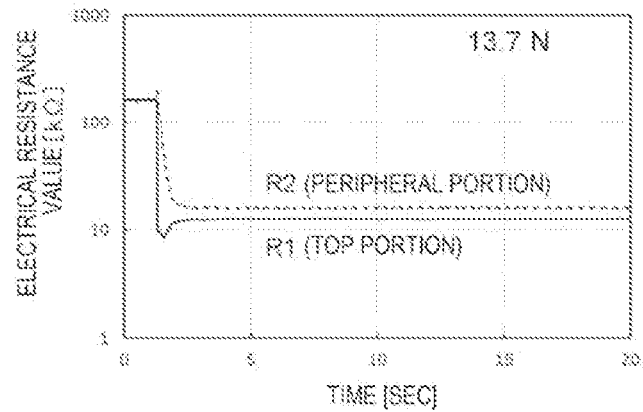
FIG. 9B is a graph showing temporal changes of the electrical resistance value R1 of the pressure-sensitive conductor of the first pressure-sensitive element and the electrical resistance value R2 of the pressure-sensitive conductor of the second pressure-sensitive element when the plastic cube is pressed against the elastic member with a load of 13.7 N.

FIGS. 9A and 9B show examples when the structure of the object changes with the change in load. FIG. 9A is a graph showing temporal changes of the electrical resistance value R1 of the pressure-sensitive conductor 142 of the first pressure-sensitive element 131 and the electrical resistance value R2 of the pressure-sensitive conductor 142 of the second pressure-sensitive element 132 when a plastic cube is pressed against the elastic member 120 with a load of 2.3 N. FIG. 9B is a graph showing temporal changes of the electrical resistance value R1 of the pressure-sensitive conductor 142 of the first pressure-sensitive element 131 and the electrical resistance value R2 of the pressure-sensitive conductor 142 of the second pressure-sensitive element 132 when the plastic cube is pressed against the elastic member 120 with a load of 13.7 N. The plastic cube is a cube made of plastic having a hollow interior.

When the load is 2.3 N, a pattern of the difference between the electrical resistance value R1 of the pressure-sensitive conductor 142 of the first pressure-sensitive element 131 and the electrical resistance value R2 of the pressure-sensitive conductor 142 of the second pressure-sensitive element 132 is close to that of the example in FIG. 6A. Therefore, it may be evaluated that the hardness of the plastic cube is close to the iron ingot when the load is 2.3 N.

On the other hand, when the load is 13.7 N, a pattern of the difference between the electrical resistance value R1 of the pressure-sensitive conductor 142 of the first pressure-sensitive element 131 and the electrical resistance value R2 of the pressure-sensitive conductor 142 of the second pressure-sensitive element 132 is close to that of the example in FIG. 7B. Therefore, it may be evaluated that the hardness of the plastic cube is close to the sponge when the load is 13.7 N.

Figure 10:
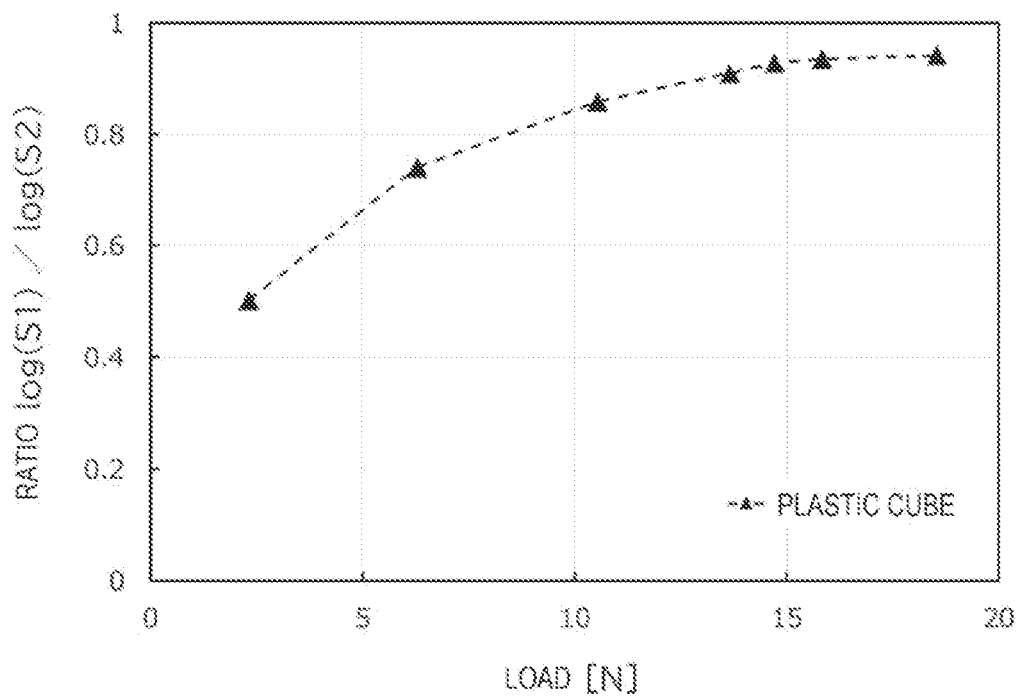
FIG. 10 is a graph showing a relationship between a ratio log(S1)/log(S2) and a load applied to the elastic member when the plastic cube is pressed against the elastic member.

FIG. 10 is a graph showing a relationship between the ratio log(S1)/log(S2) and the load applied to the elastic member 120 when the plastic cube is pressed against the elastic member 120. That is, FIG. 10 is the graph showing the change of the ratio log(S1)/log(S2) when the load with which the plastic cube is pressed against the elastic member 120 is gradually increased.

As shown in FIG. 10, the value of the ratio log(S1)/log(S2) increases when the applied load becomes larger. It is supported that the structure of the plastic cube changes when the applied load becomes larger. Specifically, there is a threshold of a resistance to load with the change in structure, it is considered that, when the applied load is smaller than the threshold, the plastic cube exhibits a behavior closer to the iron ingot, and, when the applied load is equal to or larger than the threshold, exhibits a behavior closer to the sponge. As described above, whether the structure of the object changes with the change in load may be evaluated based on the change of the value of the ratio log(S1)/log(S2).

The ratio log(S1)/log(S2) when the object is pressed against the elastic member 120 with the load of 2.3 N (first load) is "ratio $R_{1-1/2}$" and the ratio log(S1)/log(S2) when the object is pressed against the elastic member 120 with the load of 13.7 N (second load) is "ratio $R_{2-1/2}$".

The calculator 150 may be configured to measure the hardness of the object based on both the ratio $R_{1-1/2}$ and the ratio $R_{2-1/2}$.

Thereby, hardness may be measured with respect to an object having a structure changing with the increase of the load e.g., the plastic cube. As a result, the object may be properly gripped by the robot by optimization of the gripping force based on the measured hardness.

Figure 11:
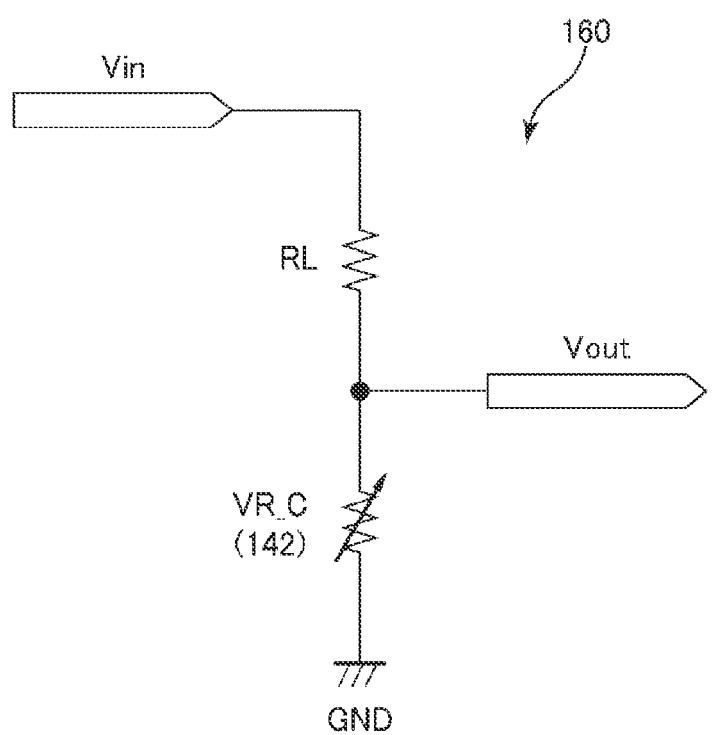
FIG. 11 is a circuit diagram showing a configuration example of a sensor output circuit.

The pressure sensor 100 may have a sensor output circuit 160 shown in FIG. 11. FIG. 11 is a circuit diagram showing a configuration example of the sensor output circuit 160.

The sensor output circuit 160 has a fixed resistor RL and a pressure-sensitive element resistor VR_C corresponding to e.g., the first pressure-sensitive element 131. The fixed resistor RL is a resistor element having a fixed electrical resistance value. The pressure-sensitive element resistor VR_C is a resistor element having an electrical resistance value changing according to the force applied to the first pressure-sensitive element 131. The fixed resistor RL and the pressure-sensitive element resistor VR_C are sequentially series-coupled between a sensor power supply voltage Vin and a ground GND. A sensor output signal Vout is output from between the fixed resistor RL and the pressure-sensitive element resistor VR_C.

In the sensor output circuit 160, the sensor output signal Vout is obtained based on the following expression $$Vout=VR\_C/(RL+VR\_C) \times Vin.$$

The intensity of the obtained sensor output signal Vout corresponds to e.g., the electrical resistance value of the first pressure-sensitive element 131.

Note that, in the sensor output circuit 160, an arbitrary element may be added or replaced as necessary to the circuit configuration shown in FIG. 11.

The calculator 150 analog/digital-converts the sensor output signal, and then, calculates the hardness of the object based on the obtained signals (first detection signal S1 and second detection signal S2). Note that the hardness of the object may be an absolute value in an arbitrary unit or a relative value to a reference value.

The pressure sensor 100 may have an output unit (not shown) outputting a calculation result by the calculator 150, an input unit (not shown) inputting data to the calculator 150, etc. The output unit includes e.g., a liquid crystal display device. The input unit includes e.g., a keyboard and a touch panel.

2. Pressure Sensor According to Modified Example

Next, a pressure sensor according to a modified example will be explained.

Figure 12:
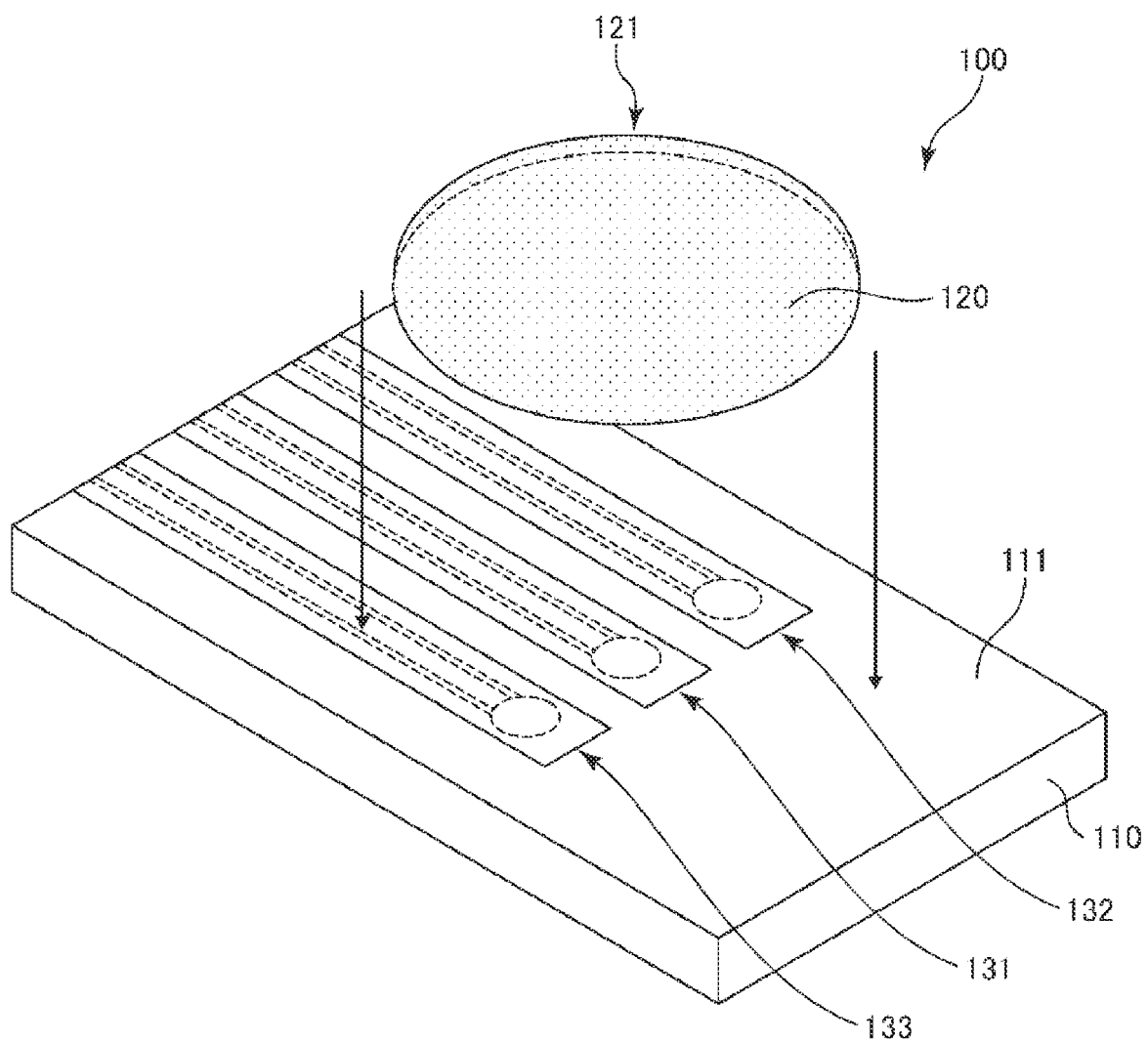
FIG. 12 is an exploded perspective view showing a pressure sensor according to a first modified example.

FIG. 12 is an exploded perspective view showing a pressure sensor 100 according to a first modified example.

As below, the first modified example will be explained with a focus on differences from the above described embodiment and the explanation of the same items will be omitted. In FIG. 12, the same configurations as those of the above described embodiment have the same signs.

The pressure sensor 100 according to the first modified example is the same as the pressure sensor 100 according to the embodiment except that a third pressure-sensitive element 133 is further provided.

The third pressure-sensitive element 133 shown in FIG. 12 is provided between the mounting surface 111 and the elastic member 120. The third pressure-sensitive element 133 is placed at the opposite side to the second pressure-sensitive element 132 with respect to the first pressure-sensitive element 131. When the third pressure-sensitive element 133 is pressed by the deformation of the elastic member 120, a third detection signal S3 is output from the third pressure-sensitive element 133.

Further, in the first modified example, a ratio log(S1)/log (S3) of the common logarithm log(S1) of the intensity of the first detection signal S1 to a common logarithm log(S3) of the intensity of the third detection signal S3 is calculated. The ratio log(S1)/log(S3) when the object is pressed against the elastic member 120 with the first load is "ratio $R_{1-1/3}$".

The calculator 150 may be configured to measure the hardness of the object based on both the ratio $R_{1-1/2}$ and the ratio $R_{1-1/3}$. Thereby, a hardness distribution of the object such that the hardness is partially different may be evaluated.

Figure 13:
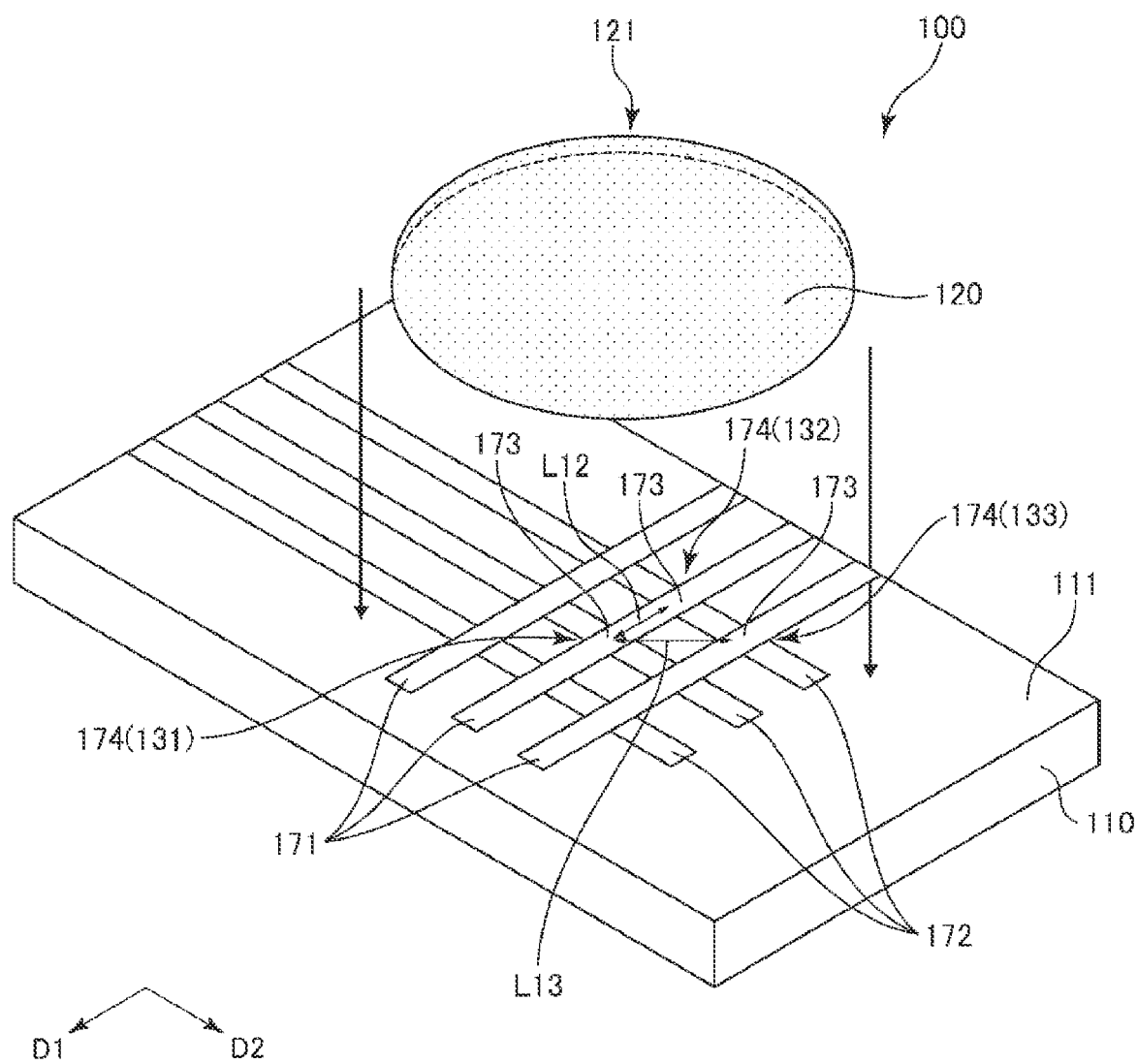
FIG. 13 is an exploded perspective view showing a pressure sensor according to a second modified example.

FIG. 13 is an exploded perspective view showing a pressure sensor 100 according to a second modified example. In FIG. 13, one direction within the mounting surface 111 is "first direction D1" and a direction orthogonal thereto is "second direction D2". The first direction D1 and the second direction D2 are respectively shown by arrows in FIG. 13 and the head sides of the arrows are referred to as "plus sides" and the tail sides are referred to as "minus sides".

As below, the second modified example will be explained with a focus on differences from the above described embodiment and the explanation of the same items will be omitted. In FIG. 13, the same configurations as those of the above described embodiment have the same signs.

The pressure sensor 100 according to the second modified example is the same as the pressure sensor 100 according to the embodiment except that the structures and the number of the pressure-sensitive elements are different.

On the mounting surface 111 of the base 110 shown in FIG. 13, three first electrodes 171 extending in the first direction D1 and arranged in the second direction D2 crossing the first direction D1 are placed. Further, on the mounting surface 111, three second electrodes 172 extending in the second direction D2 and arranged in the first direction D1 are placed. The three first electrodes 171 and the three second electrodes 172 intersect. Furthermore, pressure-sensitive conductors (not shown) intervene between the first electrodes 171 and the second electrodes 172. Thereby, nine pressure-sensitive portions 174 are formed by intersection portions 173 between the first electrodes 171 and the second electrodes 172 and the pressure-sensitive conductors corresponding to the intersection portions 173. According to the configuration, detection signals may be acquired from the large number of pressure-sensitive portions 174 even with the smaller number of wires by variations of the combination of the first electrodes 171 and the second electrodes 172. Accordingly, the pressure sensor 100 including the large number of pressure-sensitive portions 174 may be realized while the complication of the structure is avoided.

The large number of pressure-sensitive portions 174 are arranged in an array form and, in the pressure sensor 100 shown in FIG. 13, the distribution of the load may be accurately captured. Thereby, the hardness distribution of the object may be measured more accurately.

Here, of the nine pressure-sensitive portions 174, the pressure-sensitive portion 174 located in the intersection portion 173 between the center first electrode 171 and the center second electrode 172 is in the position corresponding to the vertex 122 of the elastic member 120, and corresponds to the above described "first pressure-sensitive element 131". Further, the pressure-sensitive portion 174 located in the intersection portion 173 between the center first electrode 171 and the second electrode 172 located at the minus side in the first direction D1 is in the position corresponding to the peripheral portion 123 of the elastic member 120, and corresponds to the above described "second pressure-sensitive element 132". Furthermore, the pressure-sensitive portion 174 located in the intersection portion 173 between the first electrode 171 located at the plus side in the second direction D2 and the second electrode 172 located at the minus side in the first direction D1 is in the position corresponding to the peripheral portion 123 and placed in the different position from the second pressure-sensitive element 132, and corresponds to the above described "third pressure-sensitive element 133".

When a distance between the first pressure-sensitive element 131 and the second pressure-sensitive element 132 is L12 and a distance between the first pressure-sensitive element 131 and the third pressure-sensitive element 133 is L13, L12<L13 holds.

Also, in the second modified example, the ratio log(S1)/log(S2) when the object is pressed against the elastic member 120 with the first load is "ratio $R_{1-1/2}$". Further, the ratio log(S1)/log(S3) when the object is pressed against the elastic member 120 with the first load is "ratio $R_{1-1/3}$".

In the second modified example, the calculator 150 may be configured to measure the hardness distribution of the object based on both the ratio $R_{1-1/2}$ and the ratio $R_{1-1/3}$. Further, in the second modified example, L12<L13, and the load distribution may be captured more accurately based on both the ratio $R_{1-1/2}$ and the ratio $R_{1-1/3}$. As a result, the hardness distribution of the object may be evaluated more accurately. That is, the relationship between the ratio $R_{1-1/2}$ and the ratio $R_{1-1/3}$ changes in the cases where the hardness distribution is uniform and not uniform. In the second modified example, the hardness distribution of the object may be acquired more precisely using the characteristic.

In the above described modified examples, the same effects as those of the embodiment may be obtained.

3. Robot

Next, a gripping device and a robot according to the embodiment will be explained.

Figure 14:
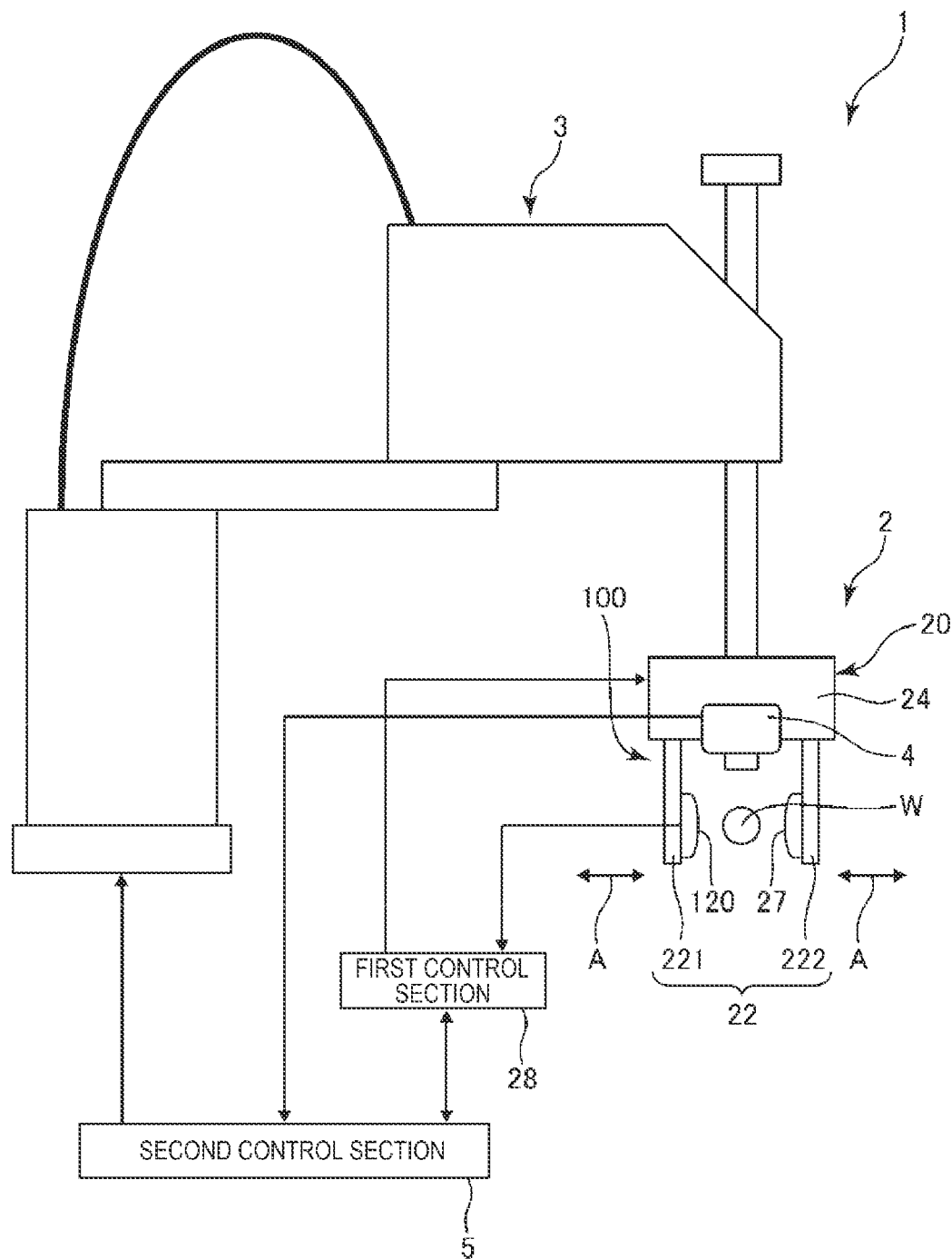
FIG. 14 is a schematic configuration diagram showing a robot according to an embodiment.
Figure 15:
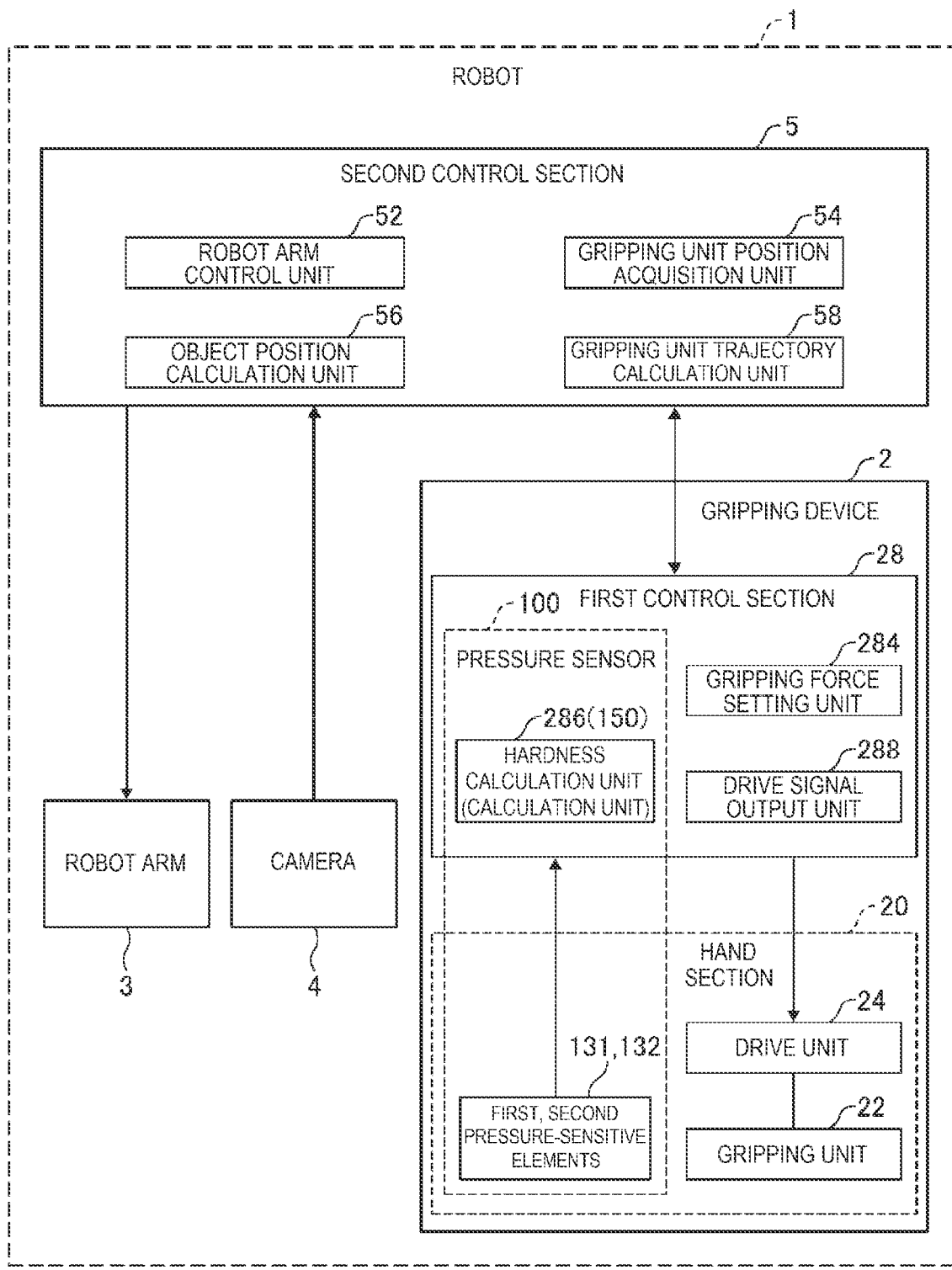
FIG. 15 is a block diagram showing the robot in FIG. 14.

FIG. 14 is a schematic configuration diagram showing a robot 1 according to the embodiment. FIG. 15 is a block diagram showing the robot 1 in FIG. 14.

The robot 1 shown in FIG. 14 includes a gripping device 2, a robot arm 3, a camera 4 (imaging unit), and a second controller 5.

The gripping device 2 includes a hand section 20 and a first controller 28. The hand section 20 includes a gripper 22, a driver 24, a part of the pressure sensor 100, and an opposing portion 27. Here, the pressure sensor 100 shown in FIG. 1 is provided.

The gripper 22 includes a pair of openable and closable finger portions 221, 222 and has a function of gripping an object W by decreasing distances of the finger portions 221, 222 to the object W. The driver 24 drives the gripper 22 to perform a gripping motion. The pressure sensor 100 is attached to the finger portion 221. The pressure sensor 100 detects a contact force applied from the object W and outputs the first detection signal S1 and the second detection signal S2. The opposing portion 27 is provided in a position opposing to the pressure sensor 100 and sandwiches the object W between the pressure sensor 100 and itself.

The first controller 28 controls operation of the driver 24 based on the first detection signal S1 and the second detection signal S2. Specifically, the first controller 28 controls the operation of the driver 24 to control the gripper 22 to grip the object W by decreasing the distance between the gripper 22 and the object W until the gripper 22 and the object W contact. Note that, in the specification, "the distance between the gripper 22 and the object W" refers to a distance between the elastic member 120 of the pressure sensor 100 and the center of gravity of the object W.

The gripping device 2 having the above described configuration is configured such that the first controller 28 controls the operation of the driver 24 based on the contact force applied to the pressure sensor 100 from the object W. Accordingly, the griping motion of the object W can be performed without acquisition of the shape of the object W from an image captured by the camera 4. Thereby, the simplification of the configuration and the cost reduction of the gripping device 2 may be realized. Further, the pressure sensor 100 has the function of measuring the hardness of the object W. Accordingly, the first controller 28 may control the operation of the gripper 22 in consideration of the hardness of the object W. Thereby, the gripping motion may be performed while damage on the object W with the gripping motion is suppressed. As a result, the gripping device 2 having a higher success rate of work and higher work efficiency may be realized.

3.1. Configurations of Respective Parts

The configurations of the respective parts of the robot 1 will be specifically described.

3.1.1. Gripping Device

As described above, the gripper 22 shown in FIG. 14 includes the two finger portions 221, 222. The finger portions 221, 222 are driven by the driver 24 to be closer to or away from each other in movement directions A shown in FIG. 14. Thereby, the gripper 22 may nip and grip the object W and release the gripping.

The driver 24 drives the two finger portions 221, 222 to be closer to or away from each other. For example, the driver 24 has a rack-and-pinion mechanism (not shown) and one motor (not shown). The unit has the drive mechanisms, and thereby, may translate the finger portions 221, 222. Note that the drive mechanisms of the driver 24 are not limited to those. For example, the finger portions 221, 222 may be independently translated by two motors. Or, the gripper 22 may open and close the finger portion 221 and the finger portion 222 to change the angle formed by the finger portions.

As shown in FIG. 15, the first controller 28 has a gripping force setting unit 284, a hardness calculator 286 (calculator 150), and a drive signal output unit 288 as functional units.

The hardness calculator 286 is the above described calculator 150 and measures the hardness of the object W at least based on the ratio $R_{1-1/2}$.

The gripping force setting unit 284 sets the gripping force by the gripper 22 when the driver 24 is operated. For example, the gripping force can be adjusted by torque of a motor provided in the driver 24. The gripping force may be set to a predetermined value in advance or updated according to the hardness of the object W calculated by the hardness calculator 286. Thereby, the object W may be gripped with the gripping force suitable for the hardness of the object W. As a result, damage on the object W may be suppressed more reliably.

The drive signal output unit 288 outputs a drive signal to the driver 24 based on the gripping force set by the gripping force setting unit 284. For example, the drive signal output unit 288 outputs electric power (drive signal) to the driver 24 by switching control. The system of the switching control includes e.g., PWM (Pulse Width Modulation) control and VFM (Variable Frequency Modulation) control. Of the control systems, the PWM control is preferably used. The PWM control is readily available because the control is easier and conversion efficiency from an input voltage to an output voltage is higher.

Figure 16:
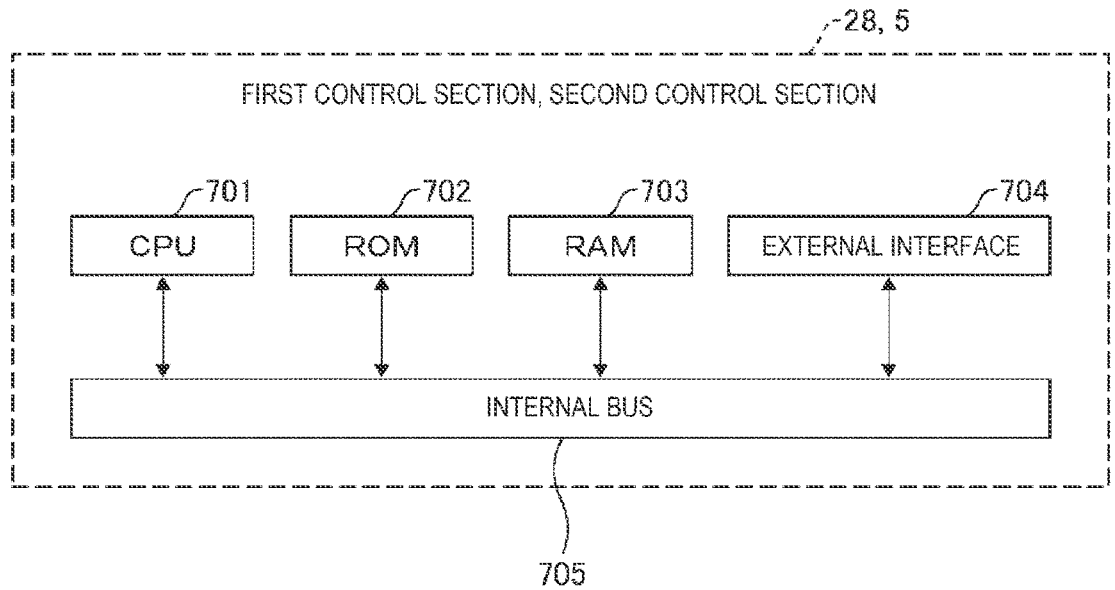
FIG. 16 shows a hardware configuration example of a first controller and a second controller in FIG. 15.

FIG. 16 shows a hardware configuration example of the first controller 28 in FIG. 15.

The functions exerted by the respective functional units of the first controller 28 are realized by hardware including e.g., a CPU 701, a ROM 702, a RAM 703, an external interface 704, and an internal bus 705 shown in FIG. 16. The CPU 701, the ROM 702, the RAM 703, and the external interface 704 can communicate with one another via the internal bus 705.

The CPU 701 is a central processing unit. Note that the CPU 701 may be a DSP (Digital Signal Processor). Further, all or part of the hardware shown in FIG. 16 may be formed by an FPGA (Field-Programmable Gate Array), an ASIC (Application Specific Integrated Circuit), or the like.

The ROM 702 is a read-only memory and formed by an arbitrary non-volatile memory element. The RAM 703 is a random access memory and formed by an arbitrary volatile memory element.

The external interface 704 includes e.g., a USB (Universal Serial Bus), a digital input/output port such as an RS-232C, an analog input/output port, and an Ethernet (registered trademark) port.

The opposing portion 27 is the same member as the elastic member 120. The object W is sandwiched between the pressure sensor 100 and the opposing portion 27, subjected to the gripping force, and gripped. Note that the opposing portion 27 may be the same member as the pressure sensor 100. That is, the opposing portion 27 may have the first pressure-sensitive element 131 and the second pressure-sensitive element 132.

3.1.2. Robot Arm

The robot arm 3 shown in FIG. 14 is an arm for a horizontal articulated robot. The hand section 20 is attached to the robot arm 3. Thereby, the robot arm 3 may change the position and the attitude of the hand section 20. In the horizontal articulated robot, the pivot plane of the arm is horizontal and the pivot speed is easily increased. Accordingly, the horizontal articulated robot is used, and thereby, the position and the attitude of the hand section 20 may be quickly changed and the work efficiency by the gripping device 2 may be increased. Note that the form of the robot arm 3 is not limited to that, but may be an arm for a vertical articulated robot.

3.1.3. Camera

The camera 4 images the object W and transmits the captured image to the second controller 5. As will be described later, the second controller 5 controls the motion of the robot arm 3 based on the acquired image. Thereby, the gripper 22 may be moved according to the position of the object W.

Note that the camera 4 may be a color camera or a monochrome camera that can image the outer shape of the object W. Or, the camera 4 may be replaced by another sensor that can detect the position of the object W.

3.1.4. Second Controller

The second controller 5 has a robot arm control unit 52, a gripper position acquisition unit 54, an object position calculator 56, and a gripper trajectory calculator 58 as functional units.

The robot arm control unit 52 controls the motion of the robot arm 3. Thereby, the hand section 20 may be moved to target position and attitude.

The gripper position acquisition unit 54 acquires the position of the gripper 22 based on the motion status of the robot arm 3.

The object position calculator 56 acquires the image captured by the camera 4. Then, the position of the object W is calculated from the acquired image. Note that the position of the object W may have a concept as a range occupied by the object W on the image or a concept as a position of the gravity center of the object W on the image. In the latter case, the amount of calculation and the time taken for the calculation may be reduced and the resource necessary for the second controller 5 may be reduced. Further, it is effective that the inexpensive, compact, and lightweight camera 4 may be used because high quality is not required for the image. Note that, in the embodiment, it is not necessary to strictly calculate the position and the shape of the object W in the gripping motion in the first place, and the simplification and the cost reduction of the resource and the camera 4 necessary for the second controller 5 may be easily realized.

The gripper trajectory calculator 58 calculates a trajectory in which the gripper 22 is moved based on the position of the object W calculated by the object position calculator 56 and the position of the gripper 22 acquired by the gripper position acquisition unit 54. The above described robot arm control unit 52 moves the gripper 22 along the trajectory.

FIG. 16 shows a hardware configuration example of the second controller 5 in FIG. 15.

The functions exerted by the respective functional units of the second controller 5 are realized by hardware including e.g., a CPU 701, a ROM 702, a RAM 703, an external interface 704, and an internal bus 705 shown in FIG. 16. The CPU 701, the ROM 702, the RAM 703, and the external interface 704 can communicate with one another via the internal bus 705.

As above, the configurations of the respective parts of the robot 1 are explained. In the embodiment, the first controller 28 mainly controls the motion of the hand section 20. That is, in the first controller 28, analog/digital conversion of the sensor output signal, feedback processing to the driver 24 based on the contact force, and opening and closing processing of the gripper 22 are controlled. In this manner, in the first controller 28, external communication with the second controller 5 may be suppressed to the minimum necessary and shifts in processing timing may be suppressed and the amount of calculation may be reduced. As a result, the higher processing speed and the higher reliability in the first controller 28 may be realized.

On the other hand, the second controller 5 controls the respective operations of the robot arm 3, the camera 4, and the first controller 28. That is, the processing performed by the first controller 28 is separated from the second controller 5. Accordingly, the necessary resource may be reduced in the second controller 5.

Note that, in the embodiment, the first controller 28 and the second controller 5 are realized by the hardware separate from each other, however, these sections may be realized by single hardware. That is, the first controller 28 and the second controller 5 may be integrated in one controller.

3.2. Control Method for Robot

Next, a control method for the robot 1 will be explained.

Figure 17:
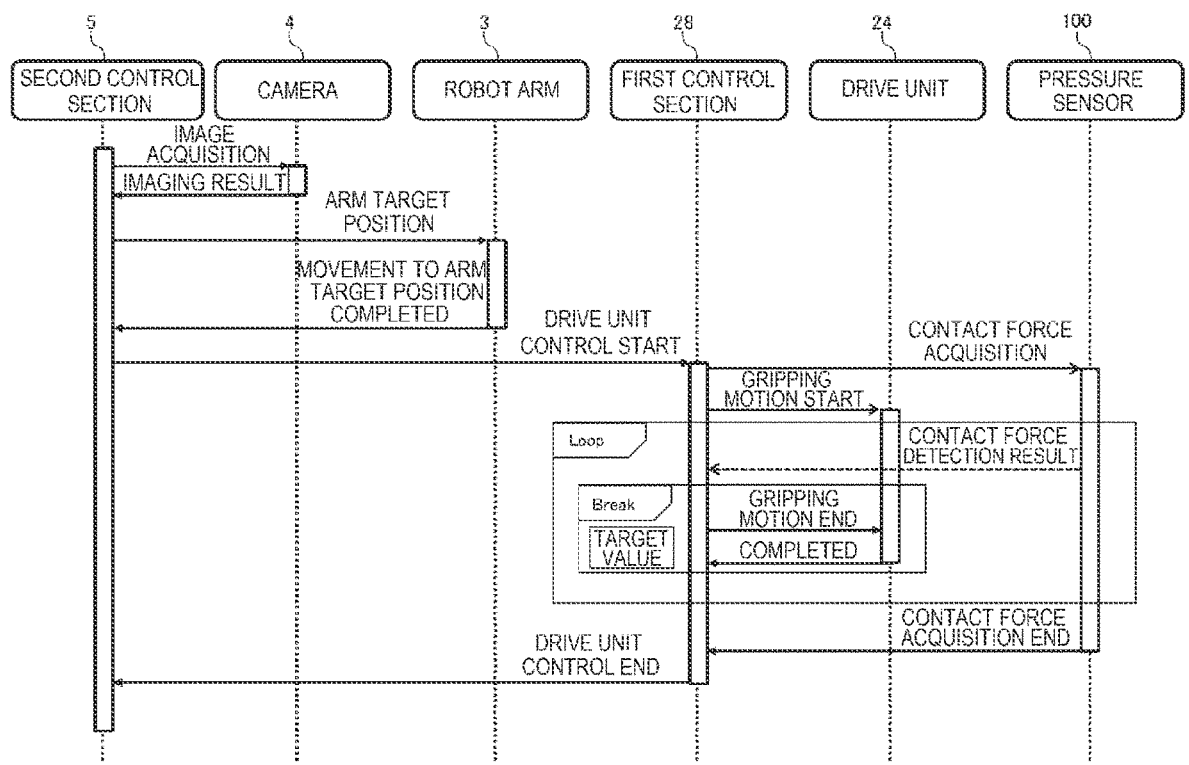
FIG. 17 is a sequence diagram for explanation of a control method for the robot.

FIG. 17 is a sequence diagram for explanation of the control method for the robot 1.

In the sequence diagram shown in FIG. 17, the component elements of the robot 1 are arranged along the horizontal axis. Further, the vertical axis indicates time.

First, the second controller 5 outputs a command for image acquisition toward the camera 4. Thereby, the camera 4 performs imaging of the object W and outputs an imaging result to the second controller 5. Then, the second controller 5 acquires an image of the object W.

Then, the second controller 5 outputs a command for a target position (arm target position) toward the robot arm 3 based on the position of the object W and the position of the gripper 22. Thereby, the robot arm 3 moves the gripper 22 to the target position, i.e., the present position of the object W. As a result, a preparation for start of the gripping motion of the object W by the gripper 22 is completed.

Then, the second controller 5 outputs a command to start the control of the driver 24 toward the first controller 28. Thereby, the first controller 28 starts detection of the contact force by the pressure sensor 100 and acquires the detection result of the contact force. Further, in parallel, the first controller 28 starts driving of the gripper 22 by the driver 24. Here, an example of the operation to continue driving until the hardness index (ratio $R_{1\text{-}1/2}$) of the object W calculated from the contact force becomes the target value is shown. That is, the detection of the contact force and the driving of the gripper 22 are repeated until the hardness index becomes the target value. Then, when the hardness index reaches the target value, the repetition is ended. Then, the first controller 28 ends the acquisition of the contact force. Further, the second controller 5 ends the control of the driver 24 by the first controller 28. In this manner, the gripping motion is completed.

3.3. Control Method for Gripping Device

Next, of the control method for the robot 1 shown in FIG. 17, the control method for the gripping device 2 will be specifically described.

Figure 18:
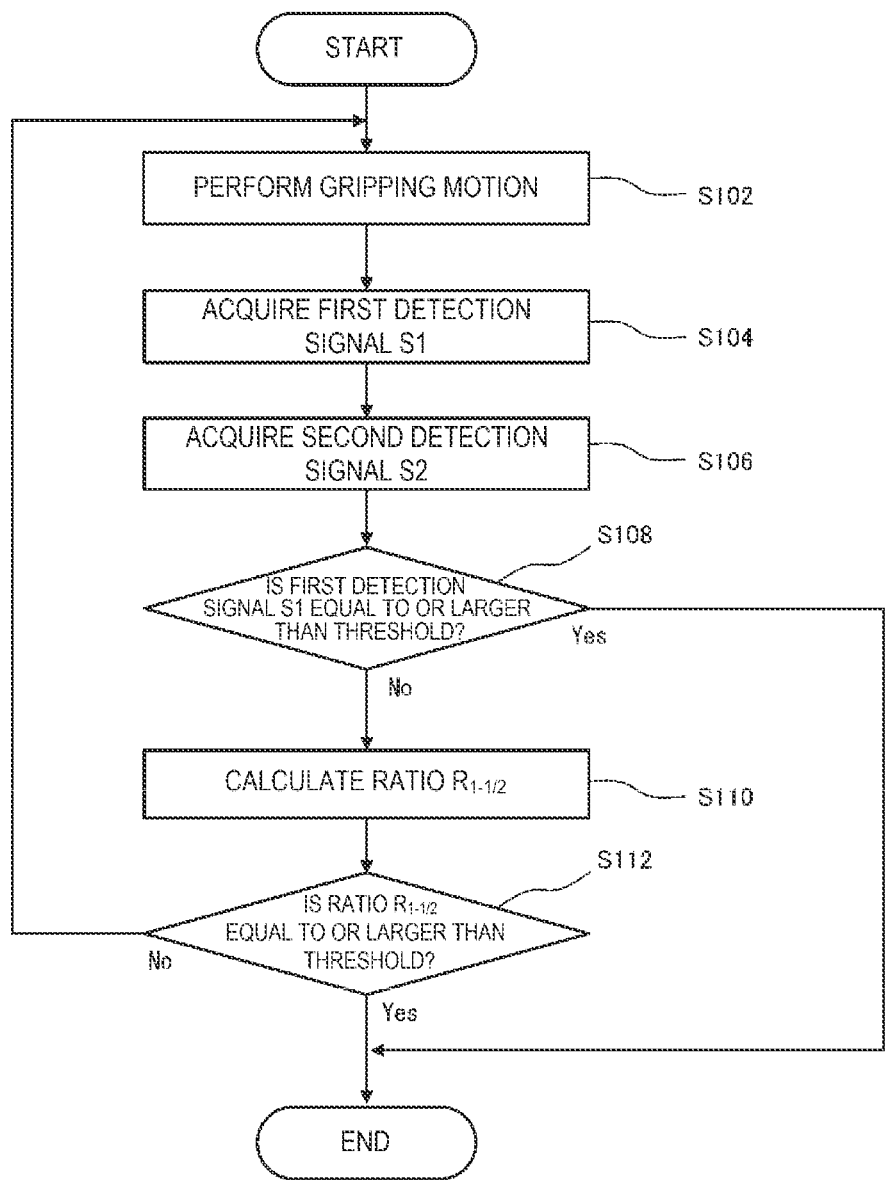
FIG. 18 is a flowchart for explanation of a control method for a gripping device.

FIG. 18 is a flowchart for explanation of the control method for the gripping device 2.

The control method for the gripping device according to the embodiment has step S102 to step S112 shown in FIG. 18. As below, the respective steps will be explained.

At step S102, the drive signal output unit 288 of the first controller 28 starts driving of the gripper 22. Thereby, the gripping motion is started. Specifically, first, the distance between the finger portions 221, 222 is increased to a width estimated to be sufficiently wider than the size of the object W. Note that the initial distance between the finger portions 221, 222 may be set based on the image captured by the camera 4 as necessary. Then, the distance between the gripper 22 and the object W is decreased by the driver 24.

At step S104, the hardness calculator 286 acquires the first detection signal S1. The elastic member 120 of the pressure sensor 100 has the convex curved surface 121 and, when the object W is pressed against the vertex 122 thereof, the first detection signal S1 is output.

At step S106, the hardness calculator 286 acquires the second detection signal S2. The second detection signal S2 is preferably acquired at the same time as the time when the first detection signal S1 is acquired.

At step S108, whether the first detection signal S1 is equal to or larger than a threshold is determined.

When the first detection signal S1 is equal to or larger than the threshold, that is, a result of the determination at step S108 is Yes, it is considered that the elastic member 120 dents the object W little. Accordingly, it is considered that the contact force applied from the object W is concentrated on the vertex 122 of the elastic member 120 and the intensity of the first detection signal S1 is larger. When the first detection signal S1 is equal to or larger than the threshold, a determination that the sufficient gripping force is applied to the object W may be made. Therefore, the gripping of the object W is completed.

On the other hand, when the first detection signal S1 is lower than the threshold, that is, the result of the determination at step S108 is No, it is considered that the gripping force is insufficient or the elastic member 120 dents the object W. Accordingly, it is considered that the contact force applied to the elastic member 120 from the object W is distributed. In this case, control in consideration of the hardness of the object W is preferable and the process goes to step S110. Note that, as the threshold for the first detection signal S1, a value set through a past performance, an experiment, a simulation, or the like may be employed.

At step S110, the ratio $R_{1-1/2}$ as the hardness index is calculated. The hardness index is the ratio log(S1)/log(S2) when the object W is pressed against the elastic member 120 with the first load. Note that the first load is not particularly limited, but preferably a load with which the difference between the electrical resistance value R1 and the electrical resistance value R2 is sufficiently large when the graphs as shown in FIGS. 6A and 6B and FIGS. 7A and 7B are acquired in advance. For instance, in the examples of FIGS. 6A and 6B and FIGS. 7A and 7B, it is regarded that the difference is sufficiently large for the load equal to or larger than about 2.0 N, and the first load may be set to e.g., 2.3 N.

At step S112, whether the hardness index (ratio $R_{1-1/2}$) is equal to or larger than a threshold is determined.

When the hardness index is equal to or larger than the threshold, that is, a result of the determination at step S112 is Yes, a determination that the object W is hard may be determined. Further, a determination that the object W can be stably gripped by application of the first load may be made. Accordingly, the gripping of the object W is completed.

On the other hand, when the hardness index is smaller than the threshold, that is, the result of the determination at step S112 is No, a determination that the object W is too soft may be made. Further, a determination that the object W is not stably gripped by application of the first load may be determined. Accordingly, the process returns to step S102. Then, at step S102, the gripping motion is performed again. That is, the operation of the driver 24 is controlled to decrease the distance between the gripper 22 and the object W. Thereby, the gripping force may be made larger than the first load.

In the above described manner, when the determination that the object W is too soft is made, the operation to increase the gripping force is repeated until the hardness index becomes equal to or larger than the threshold. Thereby, even when the object W is soft, the object W may be gripped with the gripping force according thereto, and the stable gripping motion may be realized. As a result, the success rate of work and the work efficiency of the robot 1 may be increased. Note that, as the threshold for the hardness index, a value set through a past performance, an experiment, a simulation, or the like may be employed.

4. Effects Exerted by Embodiment and Modified Examples

As described above, the pressure sensor 100 according to the above described embodiment and the above described modified examples includes the base 110, the elastic member 120, the first pressure-sensitive element 131, the second pressure-sensitive element 132, and the calculator 150. The base 110 has the mounting surface 111. The elastic member 120 is placed on the mounting surface 111 and forms the dome shape including the convex curved surface 121. The first pressure-sensitive element 131 is placed in the position between the mounting surface 111 and the elastic member 120 and corresponding to the vertex 122 of the convex curved surface 121 and outputs the first detection signal S1 by sensing pressure. The second pressure-sensitive element 132 is placed in the position between the mounting surface 111 and the elastic member 120 and corresponding to the peripheral portion 123 of the convex curved surface 121 and outputs the second detection signal S2 by sensing pressure. The calculator 150 calculates the first detection signal S1 and the second detection signal S2. Further, the calculator 150 measures the hardness of the object W based on the ratio $R_{1-1/2}$ between the first detection signal S1 and the second detection signal S2 when the object W is pressed against the elastic member 120 with the first load.

According to the pressure sensor 100, the hardness of the object W may be easily measured only by pressing of the object W against the elastic member 120.

Or, the calculator 150 may be configured to measure the hardness of the object W based on the above described ratio $R_{1-1/2}$ and ratio $R_{2-1/2}$. The ratio $R_{2-1/2}$ is the ratio between the first detection signal S1 and the second detection signal S2 when the object W is pressed against the elastic member 120 with the second load larger than the first load.

According to the configuration, the pressure sensor 100 that can measure the hardness may be realized with respect to the object W having the structure changing with the increase of the load e.g., the plastic cube. That is, the pressure sensor 100 capturing the change in resistance to deformation for the load may be realized.

The pressure sensor 100 according to the modified example includes the third pressure-sensitive element 133 outputting the third detection signal S3 by sensing pressure. The third pressure-sensitive element 133 is placed in the position between the mounting surface 111 and the elastic member 120 different from that of the second pressure-sensitive element 132 of the peripheral portion 123 of the convex curved surface 121.

The calculator 150 may be configured to measure the hardness of the object W based on the above described ratio $R_{1-1/2}$ and ratio $R_{1-1/3}$. The ratio $R_{1-1/3}$ is the ratio between the first detection signal S1 and the third detection signal S3 when the object W is pressed against the elastic member 120 with the first load.

According to the configuration, in the calculator 150, the hardness distribution of the object W may be evaluated by comparison between the ratio $R_{1-1/2}$ and the ratio $R_{1-1/3}$. Further, when the distance between the first pressure-sensitive element 131 and the second pressure-sensitive element 132 is L12 and the distance between the first pressure-sensitive element 131 and the third pressure-sensitive element 133 is L13 and L12<L13 holds, the hardness distribution of the object W may be evaluated more accurately.

Furthermore, the pressure sensor 100 according to the above described modified example includes the first electrodes 171 extending in the first direction D1, the second electrodes 172 extending in the second direction D2 crossing the first direction D1, and the pressure-sensitive conductors provided between the first electrodes 171 and the second electrodes 172. In the modified example, the first pressure-sensitive element 131, the second pressure-sensitive element 132, and the third pressure-sensitive element 133 respectively have the pressure-sensitive portions 174. The pressure-sensitive portions 174 include the intersection portions 173 between the first electrodes 171 and the second electrodes 172 and the pressure-sensitive conductors corresponding to the intersection portions 173.

According to the configuration, the detection signals may be acquired from the large number of pressure-sensitive portions 174 even with the smaller number of wires by variations of the combination of the first electrodes 171 and the second electrodes 172. Accordingly, the pressure sensor 100 including the large number of pressure-sensitive portions 174 may be realized while the complication of the structure is avoided.

The gripping device 2 according to the above described embodiment and the above described modified examples includes the gripper 22, the pressure sensor 100, the driver 24, and the first controller 28. The gripper 22 grips the object W. The pressure sensor 100 is placed in the gripper 22. The driver 24 drives the gripper 22. The first controller 28 controls the operation of the driver 24.

The pressure sensor 100 includes the base 110, the elastic member 120, the first pressure-sensitive element 131, the second pressure-sensitive element 132, and the calculator 150. The base 110 has the mounting surface 111. The elastic member 120 is placed on the mounting surface 111 and forms the dome shape including the convex curved surface 121. The first pressure-sensitive element 131 is placed in the position between the mounting surface 111 and the elastic member 120 and corresponding to the vertex 122 of the convex curved surface 121 and outputs the first detection signal S1 by sensing pressure. The second pressure-sensitive element 132 is placed in the position between the mounting surface 111 and the elastic member 120 and corresponding to the peripheral portion 123 of the convex curved surface 121 and outputs the second detection signal S2 by sensing pressure. The calculator 150 calculates the ratio $R_{1-1/2}$ between the first detection signal S1 and the second detection signal S2 when the object W is pressed against the elastic member 120 with the first load.

The first controller 28 has the function of, after starting the operation of the driver 24, continuing the operation of the driver 24 when the ratio $R_{1-1/2}$ is smaller than the threshold and stopping the operation of the driver 24 when the ratio $R_{1-1/2}$ is equal to or larger than the threshold.

According to the gripping device 2, the motion of the gripper 22 may be controlled in consideration of the hardness of the object W. For example, when the determination that the object W is too soft is made, the operation to increase the gripping force is repeated until the hardness index (ratio $R_{1-1/2}$) becomes equal to or larger than the threshold. Thereby, the stable gripping motion may be realized regardless of the hardness of the object W.

The robot 1 according to the above described embodiment or the above described modified examples includes the above described gripping device 2, the robot arm 3, and the second controller 5. The gripper 22 is attached to the robot arm 3. The second controller 5 controls the operation of the robot arm 3.

According to the robot 1, damage on the object W and dropping with the gripping motion may be suppressed, and the success rate of work and the work efficiency of the robot 1 may be increased. Further, the gripping motion may be performed without relying on the shape recognition of the object W by image processing, and the simplification and the cost reduction of the configuration of the robot 1 may be easily realized.

As above, the pressure sensor, the gripping device, and the robot according to the present disclosure are explained based on the illustrated embodiment and modified examples, however, the present disclosure is not limited to those.

For example, in the pressure sensor, the gripping device, and the robot according to the present disclosure, the respective parts of the above described embodiment and the above described modified examples may be replaced by arbitrary configurations having the same functions or arbitrary configurations may be added to the above described embodiment and the above described modified examples. For example, the above described pressure-sensitive conductor may be a piezoelectric material exhibiting the piezoelectric effect. That is, the pressure-sensitive element may be a piezoelectric element. Further, the present disclosure may be a combination of two or more of the above described embodiment and the above described modified examples.

What is claimed is:

1. A pressure sensor comprising:
a base having a mounting surface;
an elastic member mounted on the mounting surface and forming a dome shape including a convex curved surface;
a first pressure-sensitive element placed in a position between the mounting surface and the elastic member and corresponding to a vertex of the convex curved surface and outputting a first detection signal by sensing pressure;
a second pressure-sensitive element placed in a position between the mounting surface and the elastic member and corresponding to a peripheral portion of the convex curved surface and outputting a second detection signal by sensing pressure; and
a calculator performing a calculation on the first detection signal and the second detection signal, wherein
the calculator measures hardness of an object based on a ratio $R_{1-1/2}$ and a ratio $R_{2-1/2}$, and the ratio $R_{1-1/2}$ is a ratio between the first detection signal and the second detection signal when the object is pressed against the elastic member with a first load, and
the ratio $R_{2-1/2}$ is a ratio between the first detection signal and the second detection signal when the object is pressed against the elastic member with a second load larger than the first load.

2. The pressure sensor according to claim 1, further comprising a third pressure-sensitive element placed in a position between the mounting surface and the elastic member and different from that of the second pressure-sensitive element in the peripheral portion of the convex curved surface and outputting a third detection signal by sensing pressure, wherein
the calculator measures the hardness of the object based on the ratio $R_{1-1/2}$ and a ratio $R_{1-1/3}$ between the first detection signal and the third detection signal when the object is pressed against the elastic member with the first load.

3. The pressure sensor according to claim 2, further comprising:
a first electrode extending in a first direction;
a second electrode extending in a second direction crossing the first direction; and a pressure-sensitive conductor provided between the first electrode and the second electrode, wherein each of the first pressure-sensitive element, the second pressure-sensitive element, and the third pressure-sensitive element has a pressure-sensitive portion including an intersection portion between the first electrode and the second electrode and the pressure-sensitive conductor corresponding to the intersection portion.

4. A gripping device comprising:

a gripper gripping an object;

a pressure sensor placed in the gripper;

a driver driving the gripper; and a first controller controlling operation of the driver, wherein the pressure sensor includes a base having a mounting surface, an elastic member mounted on the mounting surface and forming a dome shape including a convex curved surface, a first pressure-sensitive element placed in a position between the mounting surface and the elastic member and corresponding to a vertex of the convex curved surface and outputting a first detection signal by sensing pressure, a second pressure-sensitive element placed in a position between the mounting surface and the elastic member and corresponding to a peripheral portion of the convex curved surface and outputting a second detection signal by sensing pressure, and a calculator calculating a ratio $R_{1-1/2}$ between the first detection signal and the second detection signal when the object is pressed against the elastic member with a first load, and the first controller, after starting the operation of the driver, continues the operation of the driver when the ratio $R_{1-1/2}$ is smaller than a threshold and stopping the operation of the driver when the ratio $R_{1-1/2}$ is equal to or larger than the threshold.

5. A robot comprising:

the gripping device according to claim 4;

a robot arm to which the gripper is attached; and a second controller controlling motion of the robot arm.

* * * * *